United States Patent
Louis et al.

(10) Patent No.: US 8,594,927 B2
(45) Date of Patent: Nov. 26, 2013

(54) NAVIGATION FILTER FOR A NAVIGATION SYSTEM USING TERRAIN CORRELATION

(75) Inventors: Christian Louis, Orsay (FR); Sébastien Reynaud, Savigny sur Orge (FR)

(73) Assignee: Thales, Neuilly sur Seine (FR)

( * ) Notice: Subject to any disclaimer, the term of this patent is extended or adjusted under 35 U.S.C. 154(b) by 223 days.

(21) Appl. No.: 13/166,664

(22) Filed: Jun. 22, 2011

(65) Prior Publication Data
US 2012/0022784 A1    Jan. 26, 2012

(30) Foreign Application Priority Data
Jun. 25, 2010 (FR) ...................... 10 02675

(51) Int. Cl.
*G01C 21/00* (2006.01)

(52) U.S. Cl.
USPC .......... 701/445; 701/30.2; 701/33.8; 701/479

(58) Field of Classification Search
USPC ............. 701/33.8, 30.2, 33.7, 445, 479, 532, 701/524
See application file for complete search history.

(56) References Cited

U.S. PATENT DOCUMENTS

| | | | |
|---|---|---|---|
| 4,584,646 A * | 4/1986 | Chan et al. ................. | 701/518 |
| 4,829,304 A * | 5/1989 | Baird ......................... | 342/63 |
| 4,939,663 A * | 7/1990 | Baird ......................... | 701/445 |
| 4,954,837 A   | 9/1990 | Baird et al. | |
| 5,272,639 A   | 12/1993 | McGuffin | |

OTHER PUBLICATIONS

Hektor T et al.: "A Marginalized Particle Filter approach to an integrated INS/TAP system," Position, Location and Navigation Symposium, 2008 IEEE/Ion, IEEE, Piscataway, NJ, USA, May 5, 2008, pp. 776-770.

* cited by examiner

*Primary Examiner* — Gertrude Arthur Jeanglaude
(74) *Attorney, Agent, or Firm* — Baker Hostetler LLP

(57) ABSTRACT

A navigation filter for a navigation system using terrain correlation delivering an estimation of the kinematic state of a carrier craft using a plurality of data includes the measurements returned by at least one terrain sensor, the model associated with the terrain sensor, the data from an onboard map, an error model for the onboard map, the measurements returned by an inertial guidance system, and a model of the inertial guidance system. The navigation filter also includes a first filter referred to as convergence filter, for example of the Kalman filter type, and a second filter referred to as tracking filter, for example of the particle filter type.

11 Claims, 3 Drawing Sheets

NAVIGATION FILTER FOR A NAVIGATION SYSTEM USING TERRAIN CORRELATION

CROSS-REFERENCE TO RELATED APPLICATION

This application claims priority to foreign French patent application No. FR 10 02675, filed on Jun. 25, 2010, the disclosure of which is incorporated by reference in its entirety.

FIELD OF THE INVENTION

The present invention relates to a navigation filter. It is notably applicable to the field of carrier craft navigation, and more particularly to navigation systems notably operating according to methods of terrain correlation, or Terrain Aided Navigation being denoted by the acronym TAN.

BACKGROUND OF THE INVENTION

Terrain Aided Navigation or TAN constitutes a particular means of navigation that can be applied to a wide variety of carrier vehicles, for example aircraft, submarines, autonomous missiles, etc.

There exist three main known means aimed at fulfilling the needs of carrier craft navigation. The first main known means comprises the inertial navigation techniques. The second main known means comprises the radio-navigation techniques. The third main known means comprises the navigation techniques using terrain correlation.

Inertial navigation consists in utilizing information supplied by inertial guidance systems. The operation of an inertial guidance system is based on Einstein-Galilée's principle of relativity, which postulates that it is possible, without the aid of signals external to a carrier craft, to measure, on the one hand, the speed of rotation of the carrier craft with respect to an inertial reference frame, for example defined by a geocentric reference associated with fixed stars and, on the other hand, the specific force applied to the carrier craft: typically its acceleration in the inertial reference frame, reduced by the acceleration due to gravity. A typical inertial navigation system, commonly denoted INS, is a device allowing these two quantities to be measured by means of sensors such as gyrometers and accelerometers, commonly being three in number of each type, disposed along three orthogonal axes, this set of three sensors forming an inertial measurement unit, commonly denoted IMU. The time integration of the acceleration data, and the projection into the navigation reference based on the speed of rotation data, allow the position and the speed of the carrier craft with respect to the Earth to be determined, with the knowledge of an initial state of these data. However, one drawback linked to the time integration is that the error associated with the data thus determined is an increasing function of time. This error increases more than linearly, typically exponentially, the variation of the error being commonly denoted drift of the inertial guidance system. Thus, for applications requiring a precise navigation, it is necessary to hybridize the inertial measurements with other measurements of position and/or speed and/or attitude of the carrier craft supplied by complementary sensors, such as baro-altimeters, odometers, Pitot probes, etc., with the goal of reducing the drift of the inertial guidance system. Such sensors supply information on the kinematic state of the carrier craft without requiring access to external signals or onboard maps, and are commonly denoted low-level sensors.

Radio-navigation consists in utilizing the signals coming from beacons transmitting radio signals, in order to extract information on positioning of the carrier craft with respect to these beacons. A radio-navigation technique that is widely used is the satellite geo-positioning technique, commonly denoted by the acronym GNSS corresponding to "Global Navigation Satellite System", one representative of which is the GPS technique, corresponding to "Global Positioning System". One of the drawbacks specific to radio-navigation techniques is linked to the fact that the reception of the signals coming from the beacons is not guaranteed at every place and time, and can notably be affected by the geophysical environment of the carrier craft, and also by the surrounding electromagnetic noise, where jamming techniques can notably compromise the operation of a radio-navigation device. Furthermore, since the transmitting beacons are maintained by operators, the integrity of the radio-navigation data coming from them is highly dependent on the cooperation of the latter. Radio-navigation, and notably the satellite geo-positioning system, and inertial navigation are for example complementary navigation techniques, and a hybridization of the two techniques can, in practice, result in a high-performance system. Inertial navigation indeed constitutes a very good local position estimator with a long-term drift, the satellite geo-positioning not being very reliable over the short term owing to the aforementioned drawbacks, but not exhibiting any drift. However, in the most critical applications, and notably for military applications, it is essential to turn to other sources of information on position and/or on speed and/or on attitude of the carrier craft in order to achieve hybridization with an inertial navigation technique. It is notably desirable that these alternative sources allow measurements of position and/or of speed and/or of attitude of the carrier craft which are independent, not subjected to jamming, and discrete.

Terrain Aided Navigation or TAN consists in utilizing geophysical data measurements delivered by a suitable sensor with reference data specific to a terrain covered by the navigation. The sensors are thus used in conjunction with a reference map of the terrain, also denoted onboard map. These sensors allow a data value characteristic of the terrain to be read, and the terrain aided navigation consists in comparing these values with the data of the onboard map, the onboard map being a prior sampling of the values of these data over the navigation region in question, obtained by suitable means, and henceforth denoted data production channel. Terrain Aided Navigation is particularly well adapted to hybridization with an inertial navigation technique, and allows the shortcomings of radio-navigation to be overcome. Of course, it is possible, for optimal performance, to use a navigation system allowing hybridization of the aforementioned three navigation techniques.

Generally speaking, any navigation system involving a terrain correlation thus comprises a plurality of onboard sensors comprised within the inertial guidance system, together with the terrain sensor, an onboard map representing the best possible knowledge on the reality of the geophysical data that the onboard sensor must measure, and a navigation filter. The navigation filter allows a judgment to be made, in real time, between the information supplied by the inertial guidance system and that supplied by the comparison between the measurements supplied by the terrain sensor and the onboard map. The judgment is made by the filter according to its prior knowledge of the errors on the measurements supplied. This knowledge is contained in error models. The error models relate to the inertial guidance system, the errors of the inertial guidance system being variable depending on the quality of the equipment; the error models also relate to the terrain sensor, together with the onboard map, the errors of the latter being variable depending on the quality of the data production channel. The error models for the equipment come from information supplied by the manufacturers, and/or come from measurements carried out via specific studies. The error models for the onboard maps are supplied by the data producers.

One essential aspect of the navigation is the stochastic nature of the phenomena being considered. Indeed, the sensors produce errors according to stochastic models and, since the knowledge of the geophysical data is not well controlled, the solution to the navigation problem using a filtering technique renders the navigational performance intrinsically stochastic. Thus, the filter used in a navigation system may be considered as an estimator of a stochastic process, which is to say as the device that provides, at any given moment, the dynamic state of the carrier craft modeled as a random variable.

A first example of a navigation system involving a terrain correlation is based on the technique of altimetric navigation. This technique consists in navigating a transport aircraft by means of an inertial guidance system, a terrain sensor of the radio-altimeter or multi-beam laser scanner type, measuring the distance between the carrier craft and the terrain in one or more given direction(s), and an onboard map of the Digital Terrain Model or DTM type, sampling the altitudes of points on the ground on a regular geo-localized grid.

A second example of a navigation system involving a terrain correlation is based on the bathymetric navigation technique. This technique consists in navigating a transport sea craft or submarine by means of an inertial guidance system, a terrain sensor of the single-beam or multi-beam bathymetric sounder type measuring the distance from the carrier craft to the seabed in one or more given direction(s), and an onboard map of the bathymetric map type sampling the altitudes of points on the seabed on a regular geo-localized grid.

A third example of a navigation system involving a terrain correlation is based on the technique of gravimetric navigation. This technique consists in navigating an aircraft, sea craft or submarine by means of an inertial guidance system, a terrain sensor of the gravimeter or accelerometer type measuring the local gravitational field or its anomaly, and an onboard map of the gravimetric anomaly map type sampling the values of the anomalies in the Earth's gravitational field at points of the globe on a normalized regular grid.

A fourth example of a navigation system involving a terrain correlation is based on the technique of navigation by vision. This technique consists in navigating an aircraft by means of an inertial guidance system, a terrain sensor of the onboard camera type which delivers images of the land over which it flies at a given frequency in the visible or infrared spectrum, and two onboard maps, one onboard map of the geo-localized ortho-image type, in other words an image that is re-sampled in such a manner that the effects of the mountainous areas have been removed, in other words for which the scale is the same at all the points, together with an onboard map of the DTM type.

In the framework of navigation systems involving a terrain correlation, the designers are notably confronted with a certain number of technical problems stated hereinbelow:

a navigation system must be defined that allows a desired quality of navigation according to a given set of performance criteria, for example guaranteeing a mean positioning error less than a given threshold, at a lower cost;

the most faithful error models possible for the inertial guidance system, the terrain sensor and the onboard map must be determined;

the missions of a carrier craft must be defined, notably in terms of input trajectory, during a mission preparation phase, in order to determine an optimal trajectory along which the quality of the signal delivered by the terrain sensor is maximized, where the optimal trajectory must also be defined with respect to other performance criteria for the carrier craft mission and to operational constraints associated with the theatre of the mission. The mission preparation phase must for example be based on a navigability criterion which is relevant, in other words representative of the richness of the signal delivered by the terrain sensor;

a high-performance navigation filter must be defined that is robust and capable of taking into consideration, at best, all the error models relating to the various components of the system, in other words the error of the inertial guidance system, of the terrain sensor and of the onboard map.

The main object of the present invention is to solve the aforementioned technical problem, relating to the definition of a high-performance navigation filter. According to known techniques of the prior art, the navigation filters employed in TAN systems are navigation filters of the extended Kalman filter type, commonly denoted by the acronym EKF. These filters are notorious for not being robust in the case of a lack of information coming from the terrain, resulting in cases that can lead to a divergence of the filter. Known solutions allowing these divergences to be avoided consist in coupling EKF filters with block re-centering algorithms. However, typically, block re-centering phases can last of the order of twenty seconds to one minute, during which lapse of time no information on the behaviour of the system is returned. Such "silence" effects can have a detrimental impact on the navigation of a carrier craft, which can thus travel up to 15 km, for a speed of travel equal to 250 m/s, without any means of awareness of the quality of its navigation.

Non-linear filters that are more generic than Kalman filters are known from the prior art. These are particle filters which overcome the defects of EKF filters. Nevertheless, particle filters exhibit effects of degeneration after a relatively long navigation time. For this reason, particle filters have never been utilized in practice until now in navigation applications using terrain correlation.

SUMMARY OF THE INVENTION

One goal of the present invention is to overcome at least the aforementioned drawbacks, by providing a navigation filter offering excellent robustness characteristics, excellent convergence performance, and not exhibiting the drawbacks associated with the aforementioned silence effects.

For this purpose, the subject of the present invention is a navigation filter for a terrain aided navigation system delivering an estimation of the kinematic state of a carrier craft associated with a covariance matrix at a discretized moment in time k starting from a plurality of data values comprising the measurements returned by at least one terrain sensor, the model associated with the terrain sensor, the data from an onboard map, a error model for the onboard map, the measurements returned by an inertial guidance system and a model of the inertial guidance system, the navigation filter comprising a first filter referred to as convergence filter and a second filter referred to as tracking filter, the navigation filter comprising switch-over means selecting, for the calculation of the kinematic state of the carrier craft and of the covariance matrix, one or other of the said convergence filters and tracking filter, depending on the comparison of a quality index calculated from the covariance matrix returned by the navigation filter, at the preceding moment in time k−1, with a predetermined threshold value, the navigation filter returning the values calculated by the selected filter.

In one embodiment of the invention, the quality index can be equal to a norm of the terms of a sub-matrix of the covariance matrix.

In one embodiment of the invention, the quality index can be equal to a norm of the terms of the sub-covariance matrix comprising the position terms of the carrier craft in a horizontal plane.

In one embodiment of the invention, the quality index can be equal to the sum of the squares of the diagonal terms of the covariance sub-matrix comprising the position terms of the carrier craft in a horizontal plane.

In one embodiment of the invention, the convergence filter can be a filter of the particle type.

In one embodiment of the invention, the convergence filter can be a filter of the marginalized particle type.

In one embodiment of the invention, the tracking filter can be a filter of the extended Kalman filter type denoted by the acronym EKF.

In one embodiment of the invention, the tracking filter can be a filter of the type denoted by the acronym UKF.

In one embodiment of the invention, the tracking filter can be associated with a device for rejection of outlier measurements, rejecting the measurements if the ratio between the innovation and the standard deviation of the measurement noise exceeds a second predetermined threshold value.

In one embodiment of the invention, the switch-over means delivers at the output of the navigation filter the data returned by the said convergence filter when the number of consecutive measurements rejected by the rejection device is greater than a third predetermined threshold value.

In one embodiment of the invention, the navigation filter can furthermore comprise means for comparing the local standard deviation of the measurements for navigation by terrain correlation with a fourth predetermined threshold value, the navigation filter being based only on the measurements supplied by the baro-altimeter comprised within the inertial guidance system when the standard deviation is less than the said fourth predetermined threshold value.

BRIEF DESCRIPTION OF THE DRAWINGS

Other features and advantages of the invention will become apparent upon reading the description, presented by way of example and with reference to the appended drawings, which show.

DETAILED DESCRIPTION

Figure 1:
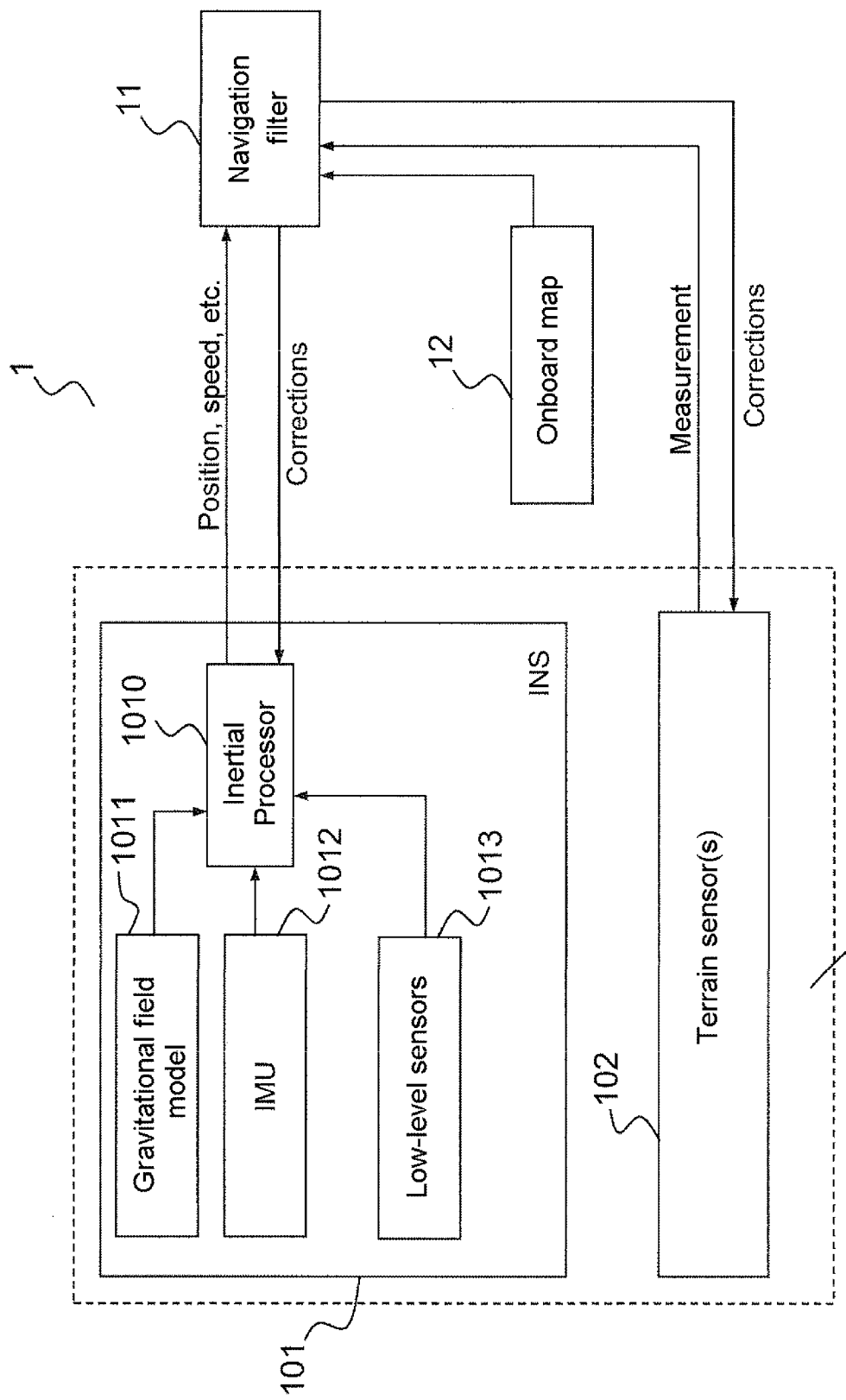
FIG. 1, a diagram illustrating schematically the structure of a navigation system involving a terrain correlation.

FIG. 1 shows a diagram illustrating schematically the structure of a navigation system involving a terrain correlation.

A navigation system 1 comprises a navigation block 10, a navigation filter 11 and an onboard map 12.

The navigation block 10 can comprise an inertial guidance system 101 and one or a plurality of terrain sensors 102. The inertial guidance system 101 can notably comprise an inertial processor 1010, receiving data coming from a gravitational model 1011, from an IMU 1012 and from one or a plurality of low-level sensors 1013.

The navigation filter 11 receives data on position, on speed and on attitude of the carrier craft, coming from the inertial processor 1010. The navigation filter 11 receives geophysical data measurements coming from the terrain sensors 102. In addition, the navigation filter 11 accesses the data contained in the onboard map 12. The navigation filter 11 can be implemented in suitable processing devices and returns estimations of the kinematic state of the carrier craft. The navigation filter 11 is also capable of applying corrections to the configuration parameters of the inertial processor 1010 and of the terrain sensors 102 and of the onboard map 12. Typically, the navigation filter 11 can for example correct biases of the terrain sensors 102 or drifts of the inertial guidance system 101 or else parameters of the error model of the onboard map 12.

The onboard map 12 can for example be formed by an assembly of various maps of various natures corresponding to each of the terrain sensors involved, which data are stored in a memory.

The solution provided by the present invention is based on the collaboration of a first filter henceforth referred to as "convergence filter", for example of the particle type, offering superior performance in the convergence or divergence phases, associated with a second filter henceforth referred to as "tracking filter", for example coming from the family of Kalman filters offering excellent performance in the tracking phases of a carrier craft, in other words in the phases where the positioning error is quite small.

As has been previously described, according to methods known per se from the prior art, an algorithm for correlation by blocks may be utilized when the "vertical" measurement model is acceptable. According to such an algorithm, a measurement profile is stored then compared with the terrain in the region of uncertainty until a satisfactory correlation is obtained. When the uncertainty on the parameters is sufficiently small, it is then possible to make use of a filter of the EKF type, which takes over from the algorithm for correlation by blocks. However, such methods have the drawback of generating silence effects in certain situations.

Figure 2:
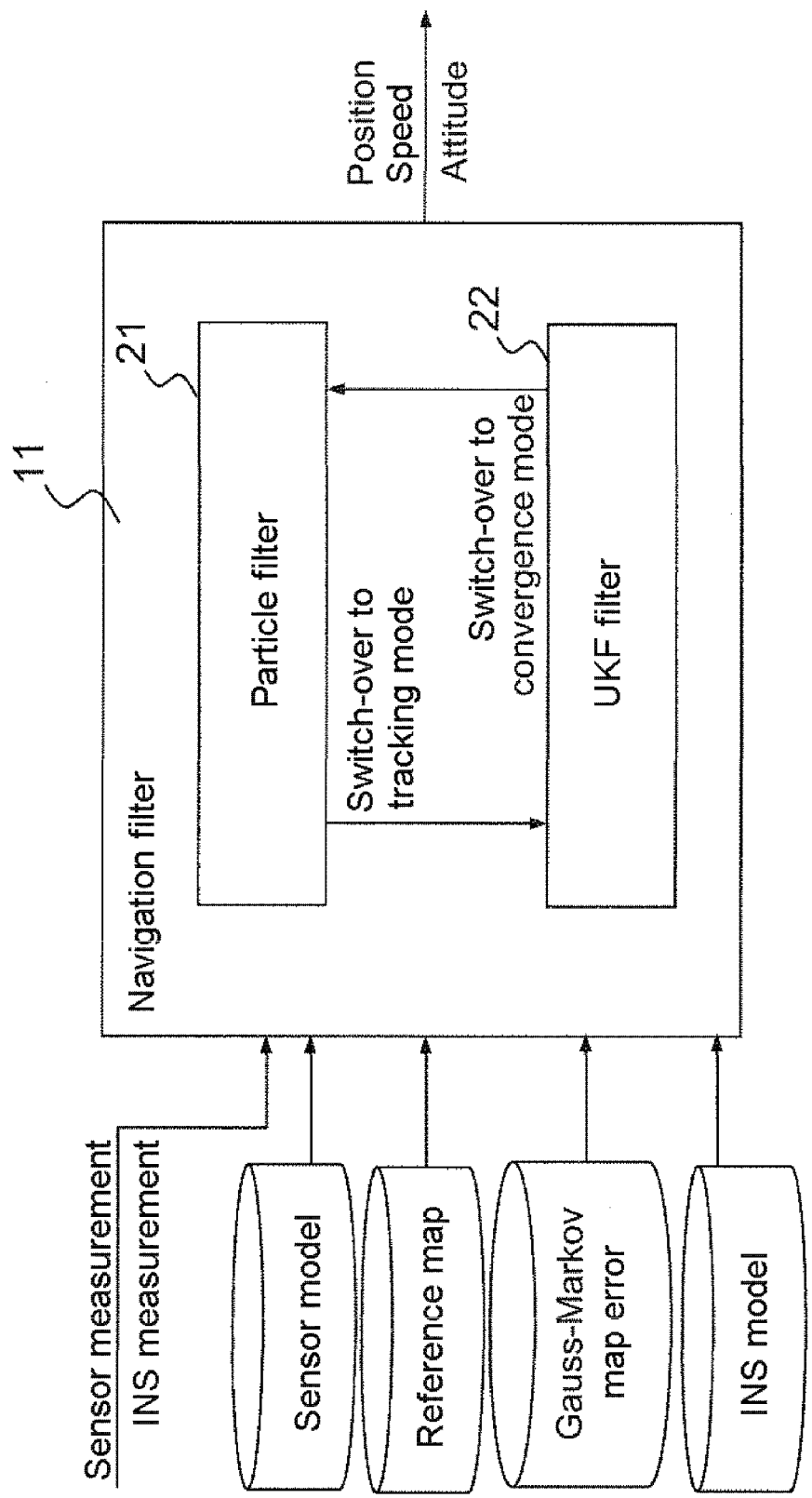
FIG. 2, a diagram illustrating schematically the structure of a navigation filter according to one exemplary embodiment of the invention.

A navigation filter according to the present invention may be illustrated by the schematic diagram shown in FIG. 2. With reference to FIG. 2, a navigation filter 11 supplying at its output an estimation of the kinematic state of a carrier craft, for example an estimation of the position, of the speed and of the attitude of the latter, receives at its input a plurality of data values, comprising the measurements carried out by the terrain sensor, the measurements returned by the inertial guidance system, the terrain sensor model, the onboard map data, the map error model, for example of the Gauss-Markov type, and the model of the inertial guidance system. The navigation filter 11 can comprise a first filter denoted convergence filter 21, for example of the particle filter type, and a second filter denoted tracking filter 22, for example of the Kalman filter type. More precisely, the tracking filter 22 can be of the type denoted EKF or UKF, respectively for "Extended Kalman Filter" and "Unscented Kalman Filter".

The optimal navigation may be considered as a non-linear filtering problem. The dynamic filtering system, discretized in the time domain, may be formalized by the following relationship:

$$\begin{cases} X_k = f_k(X_{k-1}) + W_k \\ Y_k = h_k(X_k) + V_k, \end{cases} \quad (1)$$

where:

$X_k$ denotes the state, with a dimension d, of the dynamic system at a time step k; $f_k(X_{k-1})$ denotes the state transition model applied to the dynamic state of the system at the preceding time step k−1; $W_k$ denotes the process noise, considered as coming from a normal distribution with zero mean and with covariance $Q_k$: $W_k \sim N(0, Q_k)$.

Mathematically, the measurement of the position of the platform by a geophysical sensor is represented by the second equation of the system of equations formulated in the relationship (1) hereinabove, in which h is a function, in principle non-linear, of the position and $w_k$ is a generalized measurement error dependent on both:

the measurement error of the sensor itself, the uncertainty associated with the cartography of the geophysical data;

$Y_k$ denotes the observation of the dynamic state of the system at the time step k; $h_k$ denotes the observation model; $V_k$ denotes the observation noise, coming from a distribution of the Gaussian white noise type, with zero mean and with covariance $R_k$: $V_k \sim N(0, R_k)$. The process noise $W_k$ and the observation noise $V_k$ are assumed to be independent.

The hybridization of this measurement and of the time variation equation, the first equation of the system of equations posed by the relationship (1) hereinabove, amounts mathematically to a problem of non-linear filtering. The problem posed is then to estimate, at any time t, the conditional probability distribution of the state knowing the complete set of measurements.

$X_k$ denoting the state of the platform, the optimal filtering of the random process grouping all of the random variables, $\{Xk\}$, starting from the series of the random variables, $\{y_k\}$, amounts to calculating the conditional probability expressed according to the following relationship:

$$p(X(k)|y(t), t \geq t_k) \quad (2).$$

The preceding model means that the signal k→[X(k), y($t_k$)] is a Markovian process, which allows a recursive calculation of this conditional probability. The result of this calculation is called a Bayesian optimal filter.

The principle of this optimal filtering is detailed hereinafter. The problem consists in calculating the conditional probability distribution expressed according to the following equation:

$$\mu_k(dx) = P(X(k) \in dx | Y(j), j \geq k) \quad (3),$$

where dx denotes the Borel measurement, and where, for the sake of written simplification, the following is posed: Y(j)=y($t_j$).

Assuming, for the sake of simplification, that the observation noises are independent, the observations $Y_{0:k}$ are conditionally independent knowing the hidden states $X_{0:k}$.

The law of the observations conditionally attached to the hidden states may be factorized according to the following equation:

$$P[Y_{0:k} \in dy_{0:k} | X_{0:k} = x_{0:k}] = \prod_{j=0}^{k} g_j(x_j, y_j) dy_j, \quad (4)$$

where $dy_{0:k}$ denotes the Borel measurement on $R^k = R \times R \times R \ldots \times R$ k times, with the conditional probabilities:

$$P[Y_k \in dy_k | X_k = x_k] = g_k(x_k, y_k).$$

The joint law of the hidden states and of the observations can then be written according to the following equation:

$$P[X_{0:n} \in dx_{0:k}, Y_{0:k} \in dy_{0:k}] = P[X_{0:k} \in dx_{0:k}] \prod_{j=0}^{k} g_j(x_j, y_j) dy_j. \quad (5)$$

From the equation (5) hereinabove, and by posing $g_k(x) = g_k(x, Y_k)$, the following equation can be deduced:

$$\int \Phi(x) \mu_k(dx) = E[\Phi(X_k) | Y_{0:k}] = \frac{E\left[\Phi(X_k) \prod_{j=0}^{k} g_j(X_j)\right]}{E\left[\prod_{j=0}^{k} g_j(X_j)\right]}. \quad (6)$$

The transition from $\mu_{k-1}$ to $\mu_k$ involves two steps, a prediction step and a correction step:

$$\mu_{k-1} \xrightarrow{\text{prediction}} \mu_{k|k-1} = \mu_{k-1} Q_k \xrightarrow{\text{correction}} \mu_k = g_k \mu_{k|k-1}$$

In the prediction step, the estimation on the state $X_{k-1}$ supplied by $\mu_{k-1}$ is combined with the model. As was previously described, the state $X_k$ is a Markovian process. Its transition kernel between the states at the times k−1 and k is denoted $Q_k$.

In the correction step, this a priori estimation on the state $X_k$ is combined with the information provided by the new observation $Y_k$ (quantified by the likelihood function $g_k$), and with the aid of the Bayes formula, an a posteriori estimation on the state $X_k$ can be obtained.

In practice, such a calculation, in other words such a filter, cannot be implemented since, except in certain particular cases, there exists no exhaustive dimensionally-finite summary of the conditional distribution permitting an exact implementation by calculation, for example via a computer program. The equations expressed in the relationships (3) to (6) hereinabove do not have explicit exact solutions, except in the particular case of Gaussian linear systems. This particular case corresponds to the Kalman filter, which assumes that dynamic equations of the state and of its measurement are linear and that all the errors are Gaussian. In this case, the conditional distribution is itself Gaussian. It is characterized by the conditional expectancy and the conditional covariance matrix, whose calculations can readily be implemented in computer programs.

In all the other cases, only an approximation of this filter may be envisioned. There exist various large families of methods for approximation of the Bayesian optimal filter known per se from the prior art.

A first family comprises the discrete implementations of the filter, and comprises the grids, the approaches referred to as topological approaches and the particle filters.

A second family comprises the Kalman filters, the filters of the EKF or UKF type, and the filters of the EKF type known as multiple-hypothesis filters.

These various methods each have advantages and drawbacks, and can be optimal but costly in processing time; this is the case for example of particle or grid filtering, or else optimal and fast but subject to restrictive assumptions: this is the case for example of Kalman filters, or again fast and robust but imprecise: this is the case for example of the topological approaches.

The filters may nevertheless be classified into the two categories of tracking filters, adapted to the phases where the uncertainties on the position are small, or convergence filters, adapted to the phases with large uncertainties.

For each of these two categories of filters, it is possible to select:
filters of the Kalman family for the tracking phase,
filters of the particle type for the convergence phase.

Some approximations for non-linear filtering based on filters of the Kalman family and on the family of the particle filters are described hereinafter.

In the following, the filtering is considered of a process X that satisfies the state time variation model described by the following equation:

$$X_{k+1} = f(k, X_k) + v_k \quad (7), \text{ where}$$

$w_k$ is a white noise. An observation process $Y_k$ is linked to $X_k$ via the following equation:

$$Y_k = h(k, X_k) + w_k \quad (8), \text{ where}$$

$w_k$ is a white noise, which can be modeled as independent of $v_k$ as in the assumptions for the system formulated by the previous relationship (1).

When the functions $x \rightarrow f(k,x)$ and $x \rightarrow h(k,x)$ are linear in x, and when the state and observation noises are Gaussian noises, the conditional probability distribution $\mu_k$ (dx) is Gaussian, and its two first moments are given by recursive equations which are the equations of the Kalman filter. The major advantage offered by the Kalman filter is that the performance of the filter can be calculated off line by solving an equation of the Ricatti type.

In the general non-linear case, the equations must be approximated allowing the prediction and correction steps of the filter to be managed. It is observed that, whatever the approximation chosen, the performance of the filtering method will only generally be able to be appreciated by Monte Carlo simulation.

The most elementary approach, based on filters of the EKF type, uses recursive linearization by Taylor approximation of the functions $x \rightarrow f(k,x)$ and $x \rightarrow h(k,x)$ around the estimate of the state, which can then be propagated by a Kalman filter, as in the linear case.

It is possible to replace the Taylor approximation by a stochastic approximation, or Hermite approximation, which leads to the filter of the UKF type. In such a filter, points, named sigma-points, are used, and the sigma-points are associated with weights, coming from numerical quadrature formulae, in order to represent the conditional probability distributions while avoiding any linearization.

It is also possible to approximate the conditional law $\mu_k$(dx) by a mixture of Gaussians, according to the following equation:

$$\mu_k(dx) \approx \sum_{n=1}^{n=N} p_k^n Gauss_k^n(dx), \quad (9)$$

where

Gauss denotes a Normal law with mean $M_k^n$ and covariance $S_k^n$. This approximation leads to a combination of N Kalman filters.

The advantages afforded by these techniques for the Kalman family are linked to their simplicity of implementation, to the low cost in terms of processing time, and to the excellent performance in the tracking phases. The drawbacks are linked to the inadequate inclusion of the multi-modality or of other forms of ambiguity, even temporary, often associated with large uncertainties, and with the intrinsic difficulty in linearizing an observation function only defined at one point by reading on a digital map.

The particle filtering, described hereinafter, aims to provide a solution to some of these drawbacks by approximating the Bayesian calculations of integrals for the prediction and correction steps by Monte Carlo methods. It is observed that the approximation of the Bayesian integrals can lead to various implementations.

The approach of the particle filtering type consists in a digital approach to the Bayesian filter, in other words the conditional probability distribution μk(dx) using particles, which are as many assumptions in order to represent the hidden state X, potentially assigned a weighting expressing the relevance of each particle for representing the hidden state. One approximation can then be formulated according to the following relationship:

$$P[X_k \in dx \mid Y_{0:k}] \approx \sum_{i=1}^{N} w_k^i \delta_{\xi_k^i}, \quad (10)$$

where the particles $\xi_k^i$ form a random grid that follows the time variations of the series of the hidden states, and are concentrated on the regions of interest, within which the likelihood is high.

In the prediction step, the time variation model of the inertial estimation errors, of the inertial biases and of any hyper-parameters are therefore used to allow the particles to explore the state space and relevant assumptions to be formed.

In the correction step, the likelihood of each particle is evaluated, which allows quantification relevance of each of these assumptions formed for the hidden state with the observations measured by the terrain sensor and with the estimations of position delivered by the inertial guidance system, and the weighting of each particle to thus be updated. At each iteration, or else only when a criterion allowing the imbalance in the distribution of the weightings of the particles to be quantified exceeds a given threshold, the particles are redistributed according to their respective weightings, which has the effect of multiplying the most promising particles or, conversely, of eliminating the least promising particles.

This mutation/selection mechanism has the effect of automatically concentrating the particles, in other words the processing power available in the regions of interest of the state space.

One variant commonly used for particle filters consists in utilizing the Gaussian conditionally linear nature of the problem in order to propagate a system of particles into a state space of reduced size: this method is referred to as the Rao-Blackwell or marginalization method. This method may be employed for applications of particle filtering to inertial navigation.

In the framework of inertial navigation, the state equation is usually linear with Gaussian noise, and the observation equation is non-linear with noise that is not necessarily Gaussian, but only involves certain components of the state: essentially the inertial estimation errors in position, these components being for example denoted by the term "non-linear" states XNL and the other components of the state by the term "linear states" XL.

It should be noted first of all that the conditional law for XL knowing the past observations and knowing the past non-linear states XNL only in fact depends on the past non-linear states, and that this law is Gaussian and given by a Kalman filter whose observations are the non-linear states. It should then be noted that the joint law of the non-linear states may be expressed by means of innovations.

The Rao-Blackwell method takes advantage of these points and approaches the joint conditional law for the linear states and for the past non-linear states knowing the past observations by means of a particle approximation, over a state space of reduced dimension, of the conditional law for the past states XNL knowing the past observations, and associates with each particle, which therefore represents a possible trajectory of the "non-linear" states, a Kalman filter in order to take into account the conditional law for XL knowing the past states XNL.

With respect to a conventional particle approximation, the Rao-Blackwell method reduces the variance of the approximation error and only uses the particle approximation over a state space of reduced dimension; this increases the efficiency of the algorithm accordingly while minimizing its cost in processing.

The main advantages of the particle approach reside in the immediate inclusion of the non-linearities, of the constraints related to the hidden state or to its time variation, of the non-Gaussian noise statistics, etc., and in their great ease of implementation: it indeed suffices to know how to simulate independent implementations of the hidden state model, and to know how to calculate the likelihood function at any given point of the state space, This latter restriction can furthermore be lifted. In addition, the large uncertainties on the state produce multi-modalities which are naturally taken into account by this type of approximation, which is a feature of the convergence phase.

The main drawbacks of this approach essentially reside in a longer processing time, but which may essentially be reduced to the repetition, on a sample of large size of the order of a few hundreds to a few thousands, of tasks that are furthermore very simple of complexity comparable with or even less than the complexity of an extended Kalman filter, and also in the introduction of additional uncertainties for the simulation (during the prediction step) and for the re-distribution. It is therefore recommended that the number of particles and the additional uncertainty introduced be reduced to a minimum at any given time.

The present invention provides an intelligent combination of the two families of filters, Kalman and particle filters, by selecting the best algorithm in each of the phases of convergence and tracking.

For a better understanding of the invention, the tracking algorithm of the UKF type is developed hereinafter, and is chosen by way of non-limiting example of the invention.

Filtering of the UKF type allows the linearization of the functions f and h to be avoided, by obtaining directly from f and h digital approximations of the mean and of the covariance of the dynamic state of the system. For this purpose, a set of points denoted "sigma-points", or σ-points, is generated. The functions f and h are evaluated for the σ-points. The number of σ-points created depends on the dimension d of the dynamic state vector. The σ-points are then propagated within the non-linearized prediction model. The mean and the covariance are then calculated by weighted average from the σ-points, each σ-point $X_i$ being associated with a weighting $\omega_i$.

The construction of the σ-points proposed by Rudolph van der Merwe can for example be used. According to this construction, the σ-points $x_{-d}, \ldots, x_d$ may be formulated according to the following relationship:

$$\begin{cases} x_0 = \bar{x} \\ x_{\pm i} = \bar{x} \pm S_{x \cdot e_i} \cdot \sqrt{d+\lambda}, \end{cases} \quad (11)$$

where:

$S_x$ denotes the square root of the covariance matrix, $P_x$, obtained by Cholesky decomposition, and $e_i$ is the i-th base vector.

The associated weightings $\omega_{-d}^{(m)}, \ldots, \omega_d^{(m)}$ for the estimation of the mean and $\omega_{-d}^{(c)}, \ldots, \omega_d^{(c)}$ for the estimation of the variance are given by the following relationship:

$$\begin{cases} \omega_0^{(m)} = \dfrac{\lambda}{d+\lambda} \\ \omega_0^{(c)} = \dfrac{\lambda}{d+\lambda} + (1 - \alpha^2 + \beta) \\ \omega_i^{(m)} = \omega_i^{(c)} = \dfrac{1}{2(d+\lambda)}, i \neq 0, \end{cases} \quad (12)$$

where:

$\lambda$ is a scale coefficient defined by: $\lambda = \alpha^2(d+\kappa) - d$, $\alpha, \beta, \kappa$ being parameters to be adjusted.

By using the admissible parameter settings $\alpha=1, \beta=0$ which make the weightings for the calculation of the mean and of the covariance identical, it is then possible to fix $\lambda=\kappa$. The following weightings are then considered:

$$\omega_0 = \frac{\lambda}{d+\lambda} \text{ and } \omega_{-i} = \omega_i = \frac{1}{2(d+\lambda)}. \quad (13)$$

Thus, for the prediction step, specific to any filtering system, the σ-points $x_{-d}, \ldots, x_d$ may be defined by the relationship:

$$x_0 = \hat{X}_{k-1} \text{ and } x_{\pm i} = \hat{X}_{k-1} \pm S_{k-1} \cdot e_i \sqrt{d+\lambda} \quad (14), \text{ where}$$

$\hat{X}_{k-1}$ denotes the a posteriori estimation of the dynamic state at the time k−1; $S_{k-1}$ is the square root of the covariance matrix of the state at the time k−1, $P_{k-1}$, obtained by Cholesky decomposition and $e_i$ is the i-th base vector.

The mean dynamic state vector at the time k may be formulated by the following equation:

$$\bar{X}_k = \sum_{i=-d}^{d} \omega_i f_k(x_i). \quad (15)$$

The mean covariance matrix at the time k may be formulated by the following equation:

$$\overline{P}_k = Q_k + \sum_{i=-d}^{d} \omega_i (f_k(x_i) - \overline{\hat{X}}_k) \cdot (f_k(x_i) - \overline{\hat{X}}_k)^T. \quad (16)$$

For the correction step, the σ-points $x_{-d}, \ldots, x_d$ may be defined by the relationship:

$$\begin{cases} x_0 = \overline{\hat{X}}_k \\ x_{\pm i} = \overline{\hat{X}}_k \pm \overline{S}_k \cdot e_i \cdot \sqrt{d + \lambda}, \end{cases} \quad (17)$$

where: $\overline{S}_k$ is the square root of the mean covariance matrix, $\overline{P}_k$, obtained by Cholesky decomposition and $e_i$ is the i-th base vector.

The prediction for the mean measurement vector may be formulated by the equation:

$$\overline{Y}_k = \sum_{i=-d}^{d} \omega_i h_k(x_i). \quad (18)$$

The prediction for the mean covariance matrix $\Xi_k$ at the time k may be formulated by the following equation:

$$\Xi_k = R_k + \sum_{i=-d}^{d} \omega_i (h_k(x_i) - \hat{Y}_k^-) \cdot (h_k(x_i) - \hat{Y}_k^-)^T. \quad (19)$$

The correlation matrix may be formulated by the following equation:

$$C_k = \sum_{i=-d}^{d} \omega_i (x_i - \hat{Y}_k^-) \cdot (h_k(x_i) - \hat{Y}_k^-)^T. \quad (20)$$

The estimation of the dynamic state of the system at the time k, together with the associated covariance, may then be formulated by the following relationship:

$$\begin{cases} \hat{X}_k = \overline{\hat{X}}_k + C_k \cdot \Xi_k^{-1} (Y_k - \overline{\hat{Y}}_k) \\ P_k = \overline{P}_k - C_k \cdot \Xi_k^{-1} C_k^T. \end{cases} \quad (21)$$

The algorithm can be initialized with:

$$\hat{X}_0 = E[X_0] \text{ and } P_0 = E[(X_0 - \hat{X}_0) \cdot (X_0 - \hat{X}_0)^T] \quad (22).$$

The scale parameter λ, representative of the dispersion of the σ-points around the mean value, can for example be fixed at 0.9.

When the uncertainties are greater, for example in the case where the performance of the inertial guidance system is unsatisfactory or when the information coming from the terrain are not discriminating enough, the tracking filter 22 may no longer be capable of correctly handling the filtering problem, because the conditional distribution of the state knowing the measurement can then become multi-modal.

In this case, a convergence filter should be used that is more capable of reducing the high uncertainties to lower values. Such a convergence filter function is particularly well handled by filters of the particle type.

The following part of the description describes in detail the technique of Rao-Blackwellization, or of marginalization, by way of non-limiting example of the invention, this technique allowing the particle filter used in the invention to be optimized during the convergence phase.

In the case where the particular form of the inertial equations allows the particle filter to be Rao-Blackwellized, the state of the system can then be decomposed into:

- components referred to as non-linear components denoted $X^{NL}$, namely the inertial error in position and in attitude, which appear in a non-linear manner in the observation equations,
- components referred to as linear components denoted $X^L$, namely the inertial error in speed and the bias, which appear in a linear manner in the state equations.

From a mathematical perspective, the general framework of the filtering problem is laid out hereinafter.

The state time-variation system may be formulated according to the following relationship:

$$\begin{cases} X_k^L = F_k^{L,L} X_{k-1}^L + F_k^{L,N} X_{k-1}^N + W_k^L \\ X_k^N = F_k^{N,L} X_{k-1}^L + F_k^{N,N} X_{k-1}^N + W_k^N, \end{cases} \quad (23)$$

where:

$W_k$ denotes the process noise, decomposed into linear and non-linear components, considered as coming from a normal distribution with zero mean and with covariance matrix $$Q_k: W_k = \begin{pmatrix} W_k^L \\ W_k^N \end{pmatrix} \sim N(0, Q_k),$$

the covariance matrix being written $$Q_k = \begin{pmatrix} Q_k^L & Q_k^{L,N} \\ Q_k^{N,L} & Q_k^N \end{pmatrix}$$

The observation vector may be formulated according to the following relationship, or "measurement equation":

$$Y_k = h_k^N(X_k^N) + h_k^L X_k^L + V_k \quad (24), \text{ where:}$$

$V_k$ denotes the observation noise, coming from a distribution of the Gaussian white noise type, with zero mean and with covariance $R_k$: $V_k \sim N(0, R_k)$.

The estimation of the a posteriori probability density of the state $p(X_k^L, X_k^{NL}/Y_k)$ may then be formulated, using the Bayes theorem, according to the following equation:

$$p(X_k^L, X_k^{NL}/Y_k) = \underbrace{p(X_k^l/X_k^{NL}, Y_k)}_{Kalman} \cdot \underbrace{p(X_k^{NL}/Y_k)}_{Particle}. \quad (25)$$

The non-linear part of the dynamic state of the system is represented at the time k by the particles $\xi_k^i$, $i=1, \ldots, N$, associated with the weightings $\omega_k^i$ and with the Kalman predictors $m_k^i$ for the linear part.

The initialization can be carried out using the initial covariance matrix of the state, by disposing the particles on a regular grid covering the uncertainty at around three sigma and at zero for the linear part.

The marginalization can then proceed in the following manner, decomposed into various items, for each value of i from 1 to N:

Simulation of two independent random Gaussian vectors $U^i$ and $W^i$, centered and with covariance matrix $P_k^{L/N}$ and $Q_k$; and the following is posed:

$$\xi_k^i = F_k^N(m_{k-1}^i + U^i) + f_k^N(\xi_{k-1}^N) + W^i \quad (26),$$

such that the random vector $\xi_k^i$ is Gaussian, with mean vector $F_k^N \cdot m_{k-1}^i + f_k^N(\xi_{k-1}^i)$ and with covariance matrix $F_k^N \cdot P_{k-1}^{L/N} \cdot (F_k^N)^* + Q_k^N$.

Definition of the mean vector according to the equation:

$$m_{k|k-1}^i = F_k^L m_{k-1}^i + f_k^L(\xi_{k-1}^i) + K_{k|k-1}^{L|N}(\xi_k^i - F_k^N m_{k-1}^i - f_k^N(\xi_{k-1}^i)) \quad (27),$$

and of the covariance matrix:

$$P_{k|k-1}^{L|N} = (F_k^L P_{k-1}^{L|N}(F_k^L)^* + Q_k^L) - K_{k|k-1}^{L|N}(F_k^N P_{k-1}^{L|N}(F_k^N P_{k-1}^{L|N}(F_k^L)^* + Q_k^{N,L}) \quad (28),$$

where the gain matrix $K_{k|k-1}^{L|N}$ is defined by the following equation:

$$K_{k|k-1}^{L|N} = (F_k^L P_{k-1}^{L|N}(F_k^N)^* + Q_k^{L,N})(F_k^N P_{k-1}^{L|N}(F_k^N)^* + Q_k^N)^{-1} \quad (29).$$

Definition of the weighting, formulated by the following equation:

$$\omega_k^i \propto q(y_k - h_k(\xi_k^i) - H_k m_{k|k-1}^i, H_k P_{k|k-1}^{L|N} H_k^* + R_k) \omega_{k-1}^i \quad (30).$$

Normalization of the weighting.

If the effective size of the sample becomes less than a predetermined threshold, the particles are re-distributed according to a multinomial sampling.

Definition of the mean vector formulated according to the following equation:

$$m_k^i = m_{k|k-1}^i + K_k^{L|N}(y_k - h_k(\xi_k^i) - H_k m_{k|k-1}^i) \quad (31),$$

and of the covariance matrix according to the equation:

$$P_k^{L|N} = P_{k|k-1}^{L|N} - K_k^{L|N} H_k P_{k|k-1}^{L|N} \quad (32),$$

where the gain matrix is defined by the equation:

$$K_k^{L|N} = P_{k|k-1}^{L|N} H_k^* (H_k P_{k|k-1}^{L|N} H_k^* + R_k)^{-1} \quad (33).$$

With the aim of making the filter more robust, a post-regularization step may advantageously be carried out after the particle correction step by a Gaussian kernel with regularization parameter μ, for example fixed at 0.2.

Figure 3:
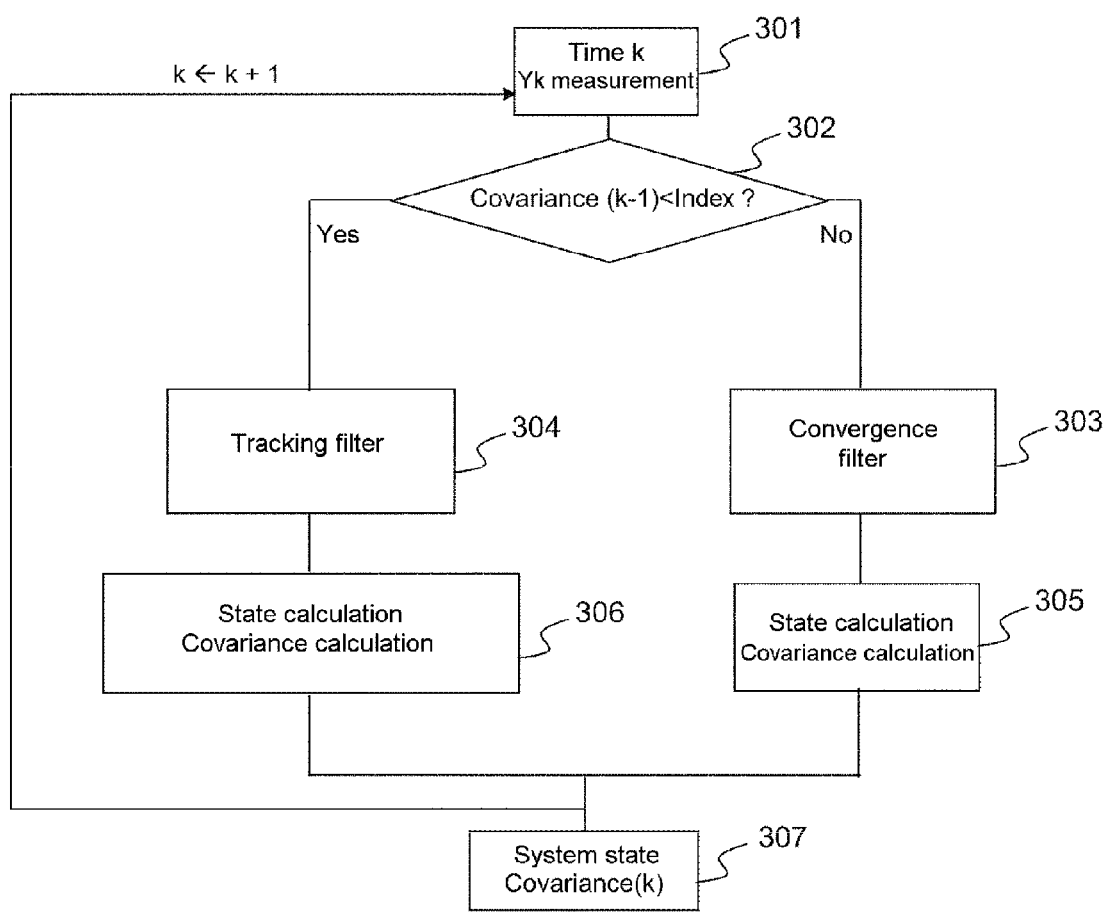
FIG. 3, a logic flow diagram illustrating the operation of a navigation filter according to one exemplary embodiment of the invention.

The navigation filter 11 provided allows advantage to be taken of the best of the two convergence and tracking filters, for example particle and Kalman filters 21, 22, according to the diagram shown in FIG. 3 and described hereinafter.

At a time k in the discretized time axis, the navigation filter 11 receives a measurement, in other words an observation of the dynamic state of the system $Y_k$, as is illustrated by a first step 301 in the figure.

The first step 301 is followed by a comparison step 302, during which the value of a quality index, calculated from the covariance matrix returned by the navigation filter at the preceding discretized time k−1, is compared with a predetermined threshold value. The quality index and the threshold value are described in detail hereinafter.

At the end of the comparison step 302, switch-over means included in the navigation filter 11 allow one or other of the two convergence and tracking filters 21, 22 to be forced to carry out the calculations of the dynamic state of the system and of the associated covariance matrix, for the time k, as is illustrated in the figure by the intermediate steps 303 to 306. The navigation filter 11 then returns, for the time k, an estimation of the state of the dynamic system and the associated covariance matrix as is shown by the last step 307 in the figure, such as returned for example by the selected filter 21, 22. For example, if the navigation filter 11 returned at the time k−1 the data calculated by the tracking filter 22 and if, at the comparison step 302, the quality index is less than the predetermined threshold value, then, for the time k, the switch-over means force the tracking filter 22 to perform the calculations, and the navigation filter 11 returns, for the time k, the state of the system and the covariance such as calculated by the tracking filter 22.

If the navigation filter 11 returned, at the time k−1, the data calculated by the tracking filter 22 and if, at the comparison step 302, the quality index is greater than the predetermined threshold value, then, for the time k, the switch-over means force the convergence filter 21 to carry out the calculations, and the navigation filter 11 returns, for the time k, the state of the system and the covariance such as calculated by the convergence filter 21.

Thus, for this last example, if, at the time k+1, the quality index remains greater than the predetermined threshold value, then, for the time k+1, the switch-over means force the convergence filter 21 to perform the calculations, and the navigation filter 11 also returns, for the time k+1, the state of the system and the covariance such as calculated by the convergence filter 21.

If, on the other hand, the quality index becomes less than the predetermined threshold value, then, for the time k+1, the switch-over means force the tracking filter 22 to carry out the calculations, and the navigation filter 11 returns, for the time k+1, the state of the system and the covariance such as calculated by the tracking filter 22.

The quality index may, for example, be the norm of the terms of a covariance sub-matrix. For example, the quality index can be defined as a norm of the terms of the covariance matrix relating to the position of the carrier craft projected into a horizontal plane (in other words onto the terms in x and y). More precisely, the norm can be defined as the sum of the squares of the diagonal terms of the covariance sub-matrix comprising the position terms in a horizontal plane.

Thus, for example, if the path of the carrier craft passes over a long region of flat terrain, the convergence filter 21, of the particle type, can take over from the tracking filter 22, of the Kalman filter type, in order to enable a re-convergence as soon as a signal usable by the NTC re-appears.

Furthermore, it is advantageously possible to add to the tracking filter 22, of the Kalman filter type, a device for rejection of outlier measurements based on the analysis of the innovation of the filter. The innovation of the filter is defined as the difference between the measurement obtained and the predicted measurement (measurement carried out in the predicted state). For example, if the innovation exceeds a second predetermined threshold value with respect to the standard deviation of the intended measurement, in other words the standard deviation of the measurement noise $V_k$, the measurement can be rejected. This embodiment allows the cases to be handled where the single-point map error is very large and does not satisfy the model provided for the region.

Again, advantageously, with the aim of allowing the detection of the divergence of the tracking filter 22, of the Kalman filter type, a variable of the counter type can be introduced, this variable representing the number of consecutive measurements that have been rejected by the navigation filter 11. When this number exceeds a third predetermined threshold value, the navigation filter 11 assumes that the tracking filter 22, of the Kalman filter type, is "lost", and can automatically switch over into particle filtering mode via the convergence filter 21, increasing by a certain factor (greater than 1), for example a factor three, the uncertainties on the position, in order to attempt to recover the position of the carrier craft.

Again, advantageously, in order to avoid the navigation filter 11 confusing a true signal with an error, for example in the case of a very flat terrain, and thus to make the filtering more robust, a fourth minimum threshold value can be introduced on the local standard deviation of the measurements involved in the NTC. If this standard deviation is less than the fourth threshold value, the navigation filter 11 can then just use the measurements from low-level sensors; in the opposite case, it can use the whole of the measurement to carry out the TAN.

The invention claimed is:

1. A navigation filter for a terrain aided navigation system, the navigation filter delivering an estimation of a kinematic state of a carrier craft associated with a covariance matrix at a discretized moment in time k, the navigation filter comprising:
   measurements returned by at least one terrain sensor,
   a model associated with the at least one terrain sensor,
   data from an onboard map,
   an error model for the onboard map,
   measurements returned by an inertial guidance system,
   a model of the inertial guidance system,
   a convergence filter, and
   a tracking filter,
   the navigation filter further comprising switch-over means for selecting, for calculation of the estimation of the kinematic state of the carrier craft and of the covariance matrix, one or more of the convergence filter and the tracking filter, based on comparison of a quality index calculated from the covariance matrix at a preceding time k−1 with a predetermined threshold value, the navigation filter returning values calculated by the selected one or more of the convergence filter and the tracking filter.

2. The navigation filter according to claim 1, wherein the quality index is equal to a norm of terms of a sub-matrix of the covariance matrix.

3. The navigation filter according to claim 1, wherein the quality index is equal to a norm of terms of a sub-covariance matrix comprising position terms of the carrier craft in a horizontal plane.

4. The navigation filter according to claim 1, wherein the quality index is equal to a sum of squares of diagonal terms of a sub-covariance matrix comprising position terms of the carrier craft in a horizontal plane.

5. The navigation filter according to claim 1, wherein the convergence filter is of a particle filter type.

6. The navigation filter according to claim 1, wherein the convergence filter is of a marginalized particle filter type.

7. The navigation filter according to claim 1, wherein the tracking filter is of an extended Kalman filter EKF type.

8. The navigation filter according to claim 1, wherein the tracking filter is of a UKF type.

9. The navigation filter according to claim 1, wherein the tracking filter is associated with a device for rejection of outlier measurements from the navigation filter, the device rejecting the outlier measurements if a ratio between an innovation and a standard deviation of measurement noise exceeds a second predetermined threshold value.

10. The navigation filter according to claim 9, wherein the switch-over means comprise means for delivering, at an output of the navigation filter, data returned by said convergence filter when a number of consecutive measurements rejected by the device is greater than a third predetermined threshold value.

11. The navigation filter according to claim 1, further comprising:
   means for comparing a local standard deviation of the measurements returned by the at least one terrain sensor with a fourth predetermined threshold value, the estimation of the kinematic state of the carrier craft being based only on measurements supplied by a baro-altimeter within the inertial guidance system when the local standard deviation is less than the fourth predetermined threshold value.

* * * * *